United States Patent
Su et al.

(10) Patent No.: US 11,810,319 B2
(45) Date of Patent: Nov. 7, 2023

(54) IMAGE DETECTION METHOD, DEVICE, STORAGE MEDIUM AND COMPUTER PROGRAM PRODUCT

(71) Applicant: Beijing Baidu Netcom Science and Technology Co., Ltd., Beijing (CN)

(72) Inventors: Xiangbo Su, Beijing (CN); Jian Wang, Beijing (CN)

(73) Assignee: Beijing Baidu Netcom Science & Technology Co., Ltd, Beijing (CN)

( * ) Notice: Subject to any disclaimer, the term of this patent is extended or adjusted under 35 U.S.C. 154(b) by 199 days.

(21) Appl. No.: 17/303,896

(22) Filed: Jun. 9, 2021

(65) Prior Publication Data

US 2021/0295088 A1 Sep. 23, 2021

(30) Foreign Application Priority Data

Dec. 11, 2020 (CN) .......................... 202011461590.X

(51) Int. Cl.
*G06T 7/62* (2017.01)
*G06T 7/73* (2017.01)
(Continued)

(52) U.S. Cl.
CPC .................. *G06T 7/73* (2017.01); *G06T 7/62* (2017.01); *G06T 7/70* (2017.01); *G06V 10/25* (2022.01);
(Continued)

(58) Field of Classification Search
CPC ... G06T 7/62; G06T 7/70; G06T 2207/20084; G06V 10/462
See application file for complete search history.

(56) References Cited

U.S. PATENT DOCUMENTS

| 2019/0279014 A1* | 9/2019 | Fang | G06T 3/40 |
| 2021/0056708 A1* | 2/2021 | Li | G06T 7/11 |

FOREIGN PATENT DOCUMENTS

| CN | 107665498 A | 2/2018 |
| CN | 108229488 A | 6/2018 |

(Continued)

OTHER PUBLICATIONS

Extended European Search Report issued from the European Patent Office to EP Application No. 21177497.1 dated Nov. 25, 2021, 8 pages.

(Continued)

*Primary Examiner* — Myron Wyche
(74) *Attorney, Agent, or Firm* — Hunton Andrews Kurth LLP

(57) ABSTRACT

Provided are an image detection method and apparatus, a device, a storage medium and a computer program product, the method includes: performing feature extraction on an image to be detected to obtain a feature map; performing target detection on the feature map through a target branch network to obtain target detection information of candidate anchor boxes at a pixel position of the feature map; performing keypoint detection on the feature map through a keypoint branch network to obtain positions of keypoints in the candidate anchor boxes at the pixel position of the feature map, and generating heatmap groups of the candidate anchor boxes according to the positions of the keypoints; and obtaining information about a target object in the image to be detected and positions of keypoints of the target object according to the target detection information and the heatmap groups.

14 Claims, 6 Drawing Sheets

(51) Int. Cl.
*G06T 7/70* (2017.01)
*G06V 10/46* (2022.01)
*G06V 10/48* (2022.01)
*G06V 10/25* (2022.01)

(52) U.S. Cl.
CPC ............ *G06V 10/462* (2022.01); *G06V 10/48* (2022.01); *G06T 2207/20084* (2013.01)

(56) References Cited

FOREIGN PATENT DOCUMENTS

| | | | | |
|---|---|---|---|---|
| CN | 108520229 | A | 9/2018 | |
| CN | 109858444 | A | 6/2019 | |
| CN | 111274977 | A | 6/2020 | |
| CN | 111325108 | A | 6/2020 | |
| CN | 111553200 | A | 8/2020 | |
| CN | 111553348 | * | 8/2020 | ............ G06V 10/25 |
| CN | 111553348 | A | 8/2020 | |
| CN | 112016475 | A | 12/2020 | |
| WO | 2018089210 | A1 | 5/2018 | |

OTHER PUBLICATIONS

Chinese Office Action issued in Application No. 202011461590.X, dated Jul. 11, 2023, 19 pages.
First Chinese Search Report issued in Application No. 202011461590X, dated Jul. 4, 2023, 9 pages.
Luo, Jie et al., "Pedestrian detection based on improved Region Proposal Network," Journal of Nanchang Hangkong University: Natural Sciences, dated Jun. 2018, vol. 32, No. 2., 8 pages.

* cited by examiner

IMAGE DETECTION METHOD, DEVICE, STORAGE MEDIUM AND COMPUTER PROGRAM PRODUCT

CROSS-REFERENCE TO RELATED APPLICATIONS

This application claims priority to Chinese Patent Application No. 202011461590.X filed with the China National Intellectual Property Administration on Dec. 11, 2020, the disclosure of which is incorporated herein by reference in its entirety.

TECHNICAL FIELD

The present application relates to the field of artificial intelligence, in particular, computer vision and deep learning, and specifically, an image detection method, a device, a storage medium and a computer program product.

BACKGROUND

Target detection is used for determining whether an object to be recognized exists in a certain region of an image. Keypoint detection is used for determining a position of a keypoint of a certain object in an image, such as detection of a keypoint of a human body.

The target detection and the keypoint detection are the basis of computer vision tasks and are widely applied in scenarios such as action classification, behavior recognition, intelligent transportation and unmanned driving. How to perform the target detection and the keypoint detection is an important issue in the industry.

SUMMARY

The present disclosure provides an image detection method and apparatus, a device, a storage medium and a computer program product.

According to the present disclosure, an image detection method is provided. The method includes steps described below.

Target detection is performed on a feature map of an image to be detected through a target branch network so that target detection information of candidate anchor boxes at a pixel position of the feature map is obtained.

Keypoint detection is performed on the feature map of the image to be detected through a keypoint branch network so that heatmap groups of the candidate anchor boxes at the pixel position of the feature map are obtained.

Positions of keypoints of a target object and information about the target object in the image to be detected are obtained according to the target detection information of the candidate anchor boxes and the heatmap groups of the candidate anchor boxes.

According to the present disclosure, an image detection apparatus is provided. The apparatus includes a target detection module, a keypoint detection module and a result determination module.

The target detection module is configured to perform target detection on a feature map of an image to be detected through a target branch network to obtain target detection information of candidate anchor boxes at a pixel position of the feature map.

The keypoint detection module is configured to perform keypoint detection on the feature map of the image to be detected through a keypoint branch network to obtain heatmap groups of the candidate anchor boxes at the pixel position of the feature map.

The result determination module is configured to obtain information about a target object in the image to be detected and positions of keypoints of the target object according to the target detection information of the candidate anchor boxes and the heatmap groups of the candidate anchor boxes.

In an embodiment, an electronic device is provided. The electronic device includes at least one processor and a memory communicatively connected to the at least one processor.

The memory stores an instruction executable by the at least one processor, and the instruction is executed by the at least one processor to cause the at least one processor to perform the image detection method of any one of embodiments of the present application.

In an embodiment, a non-transitory computer-readable storage medium is provided, which stores a computer instruction for causing a computer to perform the image detection method of any one of embodiments of the present application.

In an embodiment, a computer program product is provided. The computer program product includes a computer program which, when executed by a processor, implements the image detection method of any one of embodiments of the present application.

Image detection efficiency can be improved according to the technology of the present application.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present application. In the drawings.

DETAILED DESCRIPTION

Example embodiments of the present application, including details of embodiments of the present application, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

Figure 1:
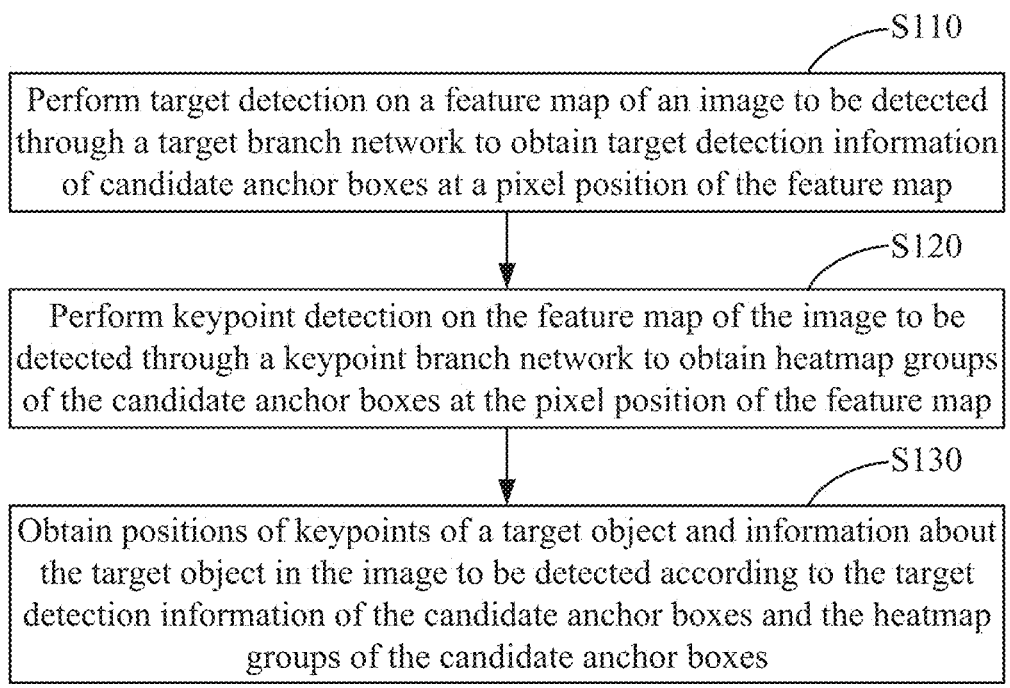
FIG. 1 is a flowchart of an image detection method according to an embodiment of the present application.

FIG. 1 is a flowchart of an image detection method according to an embodiment of the present application. This embodiment is applicable to the case where target detection and keypoint detection are performed on an image. The image detection method according to this embodiment may be performed by an electronic device and may be performed by an image detection apparatus. The apparatus may be implemented by software and/or hardware and is disposed in the electronic device. Referring to FIG. 1, the image detection method provided in this embodiment includes steps described below.

In S110, target detection is performed on a feature map of an image to be detected through a target branch network so that target detection information of candidate anchor boxes at a pixel position of the feature map is obtained.

In S120, keypoint detection is performed on the feature map of the image to be detected through a keypoint branch network so that heatmap groups of the candidate anchor boxes at the pixel position of the feature map are obtained.

In S130, positions of keypoints of a target object and information about the target object in the image to be detected are obtained according to the target detection information of the candidate anchor boxes and the heatmap groups of the candidate anchor boxes.

In the embodiment of the present application, feature extraction may be performed on the image to be detected through a feature extraction network so that the feature map is obtained. For example, the feature extraction network may include a backbone network and a feature pyramid network. Correspondingly, the image to be detected may be inputted into the backbone network so that feature maps with different scales and depths are obtained, and the feature maps with different scales and depths may be inputted into the feature pyramid network so that a desired feature map with a particular scale is obtained. The structure of the backbone network is not limited in the embodiments of the present application. For example, the structure of the backbone network may be a network structure based on You Only Look Once (YOLO) framework, such as a DarkNet, ResNet and other network structures.

In the embodiment of the present application, the target branch network is used for performing the target detection on the image to be detected, and the keypoint branch network is used for performing the keypoint detection on the image to be detected. Network structures of the target branch network and the keypoint branch network are not limited. For example, both the target branch network and the keypoint branch network may adopt a convolutional neural network.

The target detection information of a candidate anchor box may denote as (conf, x, y, Target_w, Target_h, class), where conf denotes the confidence of the candidate anchor box including the target object, x and y denote a position of a center point of a normalized ground-truth bounding box, Target_w and Target_h denote scales of the normalized ground-truth bounding box, and class denotes a vector having a length N, which indicates a value corresponding to a probability of the target object belonging to a certain category within a vector corresponding to an index of the category. That is, the target detection information of the candidate anchor box may have a length of 5+N.

At the target detection stage, the feature map may be inputted to the target branch network, multiple candidate anchor boxes with different sizes and proportions are generated at pixel positions of the feature map through the target branch network, it is determined whether a region of a candidate anchor box includes a target object of interest, and edges of the region of the candidate anchor box are adjusted, so as to predict a ground-truth bounding box of the target object. Using an example in which the feature map associated with the target branch network has a width of 13 and a height of 13 and there are A different anchor boxes at each pixel position, the number of candidate anchor boxes of the target branch network is 13×13×A.

In the embodiment of the present application, the target branch network has a one-to-one correspondence with the keypoint branch network. That is to say, each target branch network is associated with one keypoint branch network used for performing the keypoint detection on the target object detected through the associated target branch network, and channels in the keypoint branch network are associated with candidate anchor boxes in the target branch network. At the keypoint detection stage, the feature map is inputted to the keypoint branch network, and a heatmap group is generated for each candidate anchor box in the associated target branch network through the keypoint branch network. Using an example in which the target branch network has 13×13×A candidate anchor boxes, the number of channels in the keypoint branch network is 13×13×A. That is, the keypoint detection is performed on each candidate anchor box through the keypoint branch network so that 13×13×A heatmap groups are obtained. In the case where each target object has K keypoints, each heatmap group may include K heatmaps.

The information about the target object in the image to be detected may include a position of the ground-truth bounding box of the target object and a category of the target object, and the positions of the keypoints of the target object may be the positions of the keypoints in the target object. In an embodiment, the information about the target object in the image to be detected may be obtained according to the target detection information of the candidate anchor boxes; and the positions of the keypoints of the target object are obtained according to information about a candidate anchor box associated with the target object and an association relationship between candidate anchor boxes and heatmap groups.

The target branch network and the keypoint branch network are jointly used for processing the feature map of the image to be detected, and the positions of the keypoints of the target object and the information about the target object in the image to be detected can be determined through a result of detection performed on the feature map by the target branch network combined with the keypoint branch network, which improves the detection efficiency compared with separate target detection and keypoint detection performed on the image to be detected through a two-stage model.

According to the technical scheme in the embodiment of the present application, based on an association relationship between channels in the keypoint branch network and candidate anchor boxes in the target branch network, the target detection information of the candidate anchor boxes and the heatmap groups of the candidate anchor boxes at the pixel position of the feature map are obtained through the detection performed on the feature map of the image to be detected and separately by the target branch network and the keypoint branch network; and the positions of the keypoints of the target object and the information about the target object in the image to be detected are obtained according to the target detection information of the candidate anchor boxes and the heatmap groups of the candidate anchor boxes, thereby implementing the joint detection of a target and keypoints in the image to be detected and improving image detection efficiency.

Figure 2:
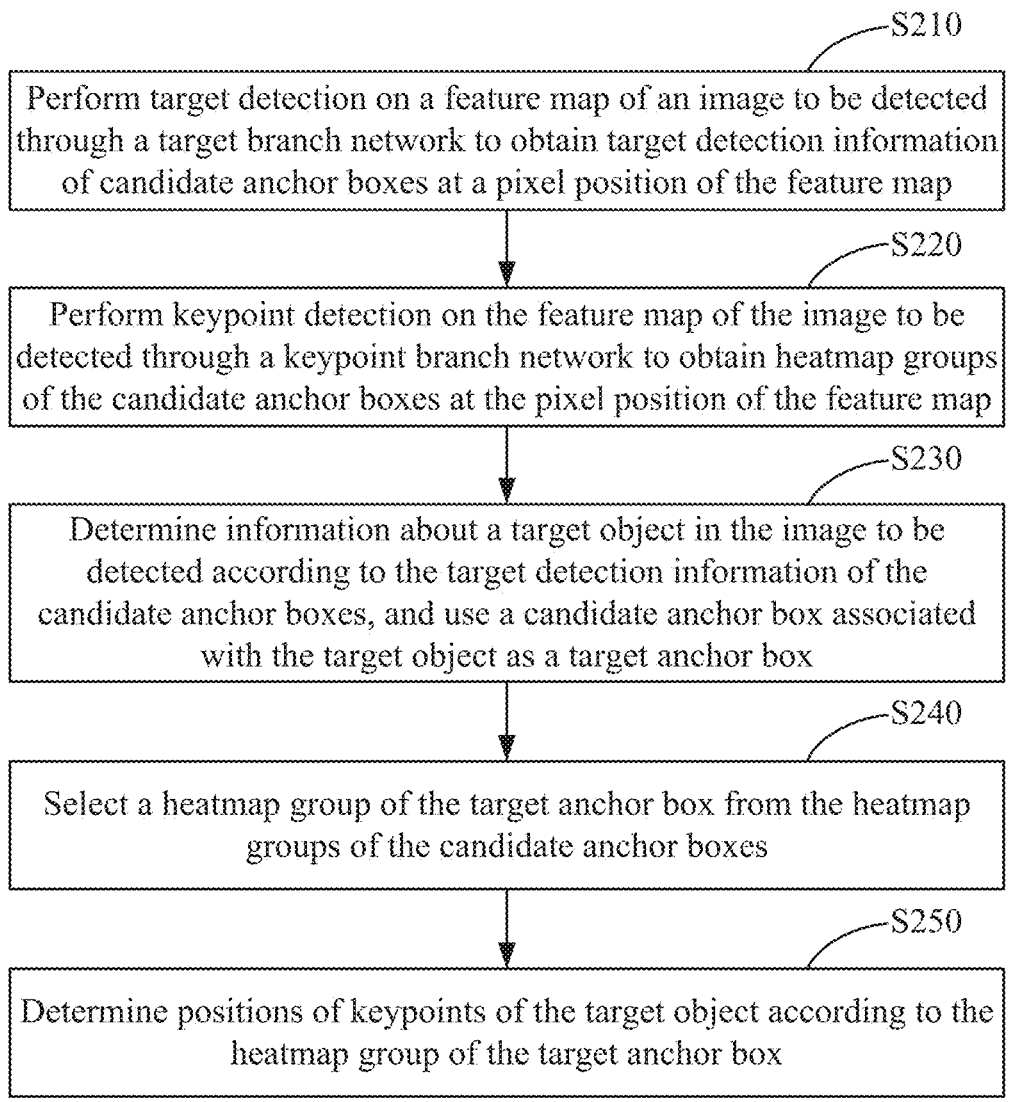
FIG. 2 is a flowchart of another image detection method according to an embodiment of the present application.

FIG. 2 is a flowchart of another image detection method according to an embodiment of the present application. This embodiment is an alternative scheme provided on the basis of the preceding embodiment. Referring to FIG. 2, the image detection method provided in this embodiment includes steps described below.

In S210, target detection is performed on a feature map of an image to be detected through a target branch network so that target detection information of candidate anchor boxes at a pixel position of the feature map is obtained.

In S220, keypoint detection is performed on the feature map of the image to be detected through a keypoint branch network so that heatmap groups of the candidate anchor boxes at the pixel position of the feature map are obtained.

In S230, information about a target object in the image to be detected is determined according to the target detection information of the candidate anchor boxes, and a candidate anchor box associated with the target object is used as a target anchor box.

In S240, a heatmap group of the target anchor box is selected from the heatmap groups of the candidate anchor boxes.

In S250, positions of keypoints of the target object are determined according to the heatmap group of the target anchor box.

In an embodiment, the information about the target object in the image to be detected may be determined from the target detection information of the candidate anchor boxes based on the non-maximum suppression (NMS) algorithm, and the candidate anchor box associated with the target object is used as the target anchor box, that is, a candidate anchor box associated with a ground-truth bounding box of the target object is used as the target anchor box, and the heatmap group of the target anchor box is a heatmap group of keypoints in the target object; and the positions of the keypoints of the target object are determined according to the heatmap group of the target anchor box. Not only the target anchor box but also other candidate anchor boxes are at a pixel position of a center point of the target object. Keypoints in the target anchor box certainly belong to the target object so that mismatching between keypoints and target objects can be avoided, thereby improving the detection accuracy of keypoints.

In an alternative embodiment, the step in which the heatmap group of the target anchor box is selected from the heatmap groups of the candidate anchor boxes includes: obtaining a target index number according to a size of the feature map, an anchor box number and the pixel position of the feature map of the target anchor box; and selecting a heatmap group associated with the target index number from the heatmap groups of the candidate anchor boxes as the heatmap group of the target anchor box.

The pixel position of the feature map of the target anchor box refers to a pixel position of a center point of the target anchor box on the feature map, that is, the pixel position of the center point of the target object. Not only the target anchor box but also other candidate anchor boxes are at the pixel position of the feature map of the target anchor box. The anchor box number refers to a sequence number of the target anchor box among the candidate anchor boxes at the pixel position of the feature map of the target anchor box. Using an example in which there are A candidate anchor boxes at each pixel position, an anchor box number a of the target anchor box refers to that an $a^{th}$ anchor box among the A candidate anchor boxes at the pixel position is the target anchor box. The size of the feature map refers to a width and a height of the feature map in the target branch network associated with the keypoint branch network. The target index number is used for uniquely identifying the target anchor box and the heatmap group of the target anchor box. In the keypoint branch network, each candidate anchor box has its own unique candidate index number, which may be used as a unique index number of the heatmap group of the candidate anchor box.

A unique index number of the target anchor box, that is, the target index number, is determined according to the size of the feature map, the anchor box number and the feature map pixel position of the target anchor box; and a candidate heatmap group associated with the target index number is selected from the heatmap groups of the candidate anchor boxes (that is, candidate heatmap groups) as a target heatmap group. Since the heatmap group of each candidate anchor box has its unique index number, the heatmap group of the target anchor box can be quickly and accurately positioned through the target index number so that keypoint detection efficiency can be further improved.

In an alternative embodiment, the step of obtaining the target index number according to the size of the feature map, the anchor box number and the pixel position of the feature map of the target anchor box includes: obtaining the target index number by the following formula: $c = a \times w \times h + j \times w + i$; where $(i, j)$ denotes the pixel position of the feature map of the target anchor box, a denotes the anchor box number, $(w, h)$ denotes the size of the feature map, and c denotes the target index number.

$c = a \times w \times h + j \times w + i$ is an index number generation rule for candidate anchor boxes in the keypoint branch network. In a process of generating index numbers of candidate anchor boxes, index numbers of $w \times h$ candidate anchor boxes numbered a precede index numbers of $w \times h$ candidate anchor boxes numbered $a+1$; for the $w \times h$ candidate anchor boxes numbered a, index numbers of w candidate anchor boxes in an $i^{th}$ row precede index numbers of w candidate anchor boxes in an $(i+1)^{th}$ row; and for the w candidate anchor boxes in the $i^{th}$ row, an index number of a candidate anchor box in a $i^{th}$ column precedes an index number of a candidate anchor box in a $(j+1)^{th}$ column. Using an example in which the feature map in the target branch network associated with the keypoint branch network has a size of (13, 13), the index number generation rule of the keypoint branch network is $c = a \times 13 \times 13 + j \times 13 + i$. Using an example in which the feature map has a size of (26, 26), the index number generation rule is $c = a \times 26 \times 26 + j \times 26 + i$. Using an example in which the feature map has a size of (52, 52), the index number generation rule is $c = a \times 52 \times 52 + j \times 52 + i$. The preceding index number generation rule facilitates the construction of the index numbers of the candidate anchor boxes and can improve the positioning efficiency of the heatmap group of the target anchor box based on the index number.

In an alternative embodiment, the step in which the positions of the keypoints of the target object are determined according to the heatmap group of the target anchor box includes: determining a position of a maximum value in each heatmap in the heatmap group of the target anchor box;

and determining the positions of the keypoints of the target object according to the position of the maximum value in each heatmap, a size of the each heatmap and a size of the image to be detected.

In the heatmap group of the target anchor box (that is, the target heatmap group), a point with the maximum value in each heatmap is a keypoint of the target object; and the positions of the keypoints in the image to be detected, that is, the positions of the keypoints of the target object, can be obtained according to a position of a keypoint in each heatmap, the size of the each heatmap and the size of the image to be detected. The positions of the keypoints of the target object in the image to be detected can be quickly and accurately obtained according to the position of the maximum value in each heatmap of the target anchor box, the size of the each heatmap and the size of the image to be detected.

In an alternative embodiment, a position of each keypoint in the target object is obtained by the following formulas:

$$U=(u/W) \times \text{image\_width; and}$$

$$V=(v/H) \times \text{image\_height;}$$

where (u, v) denotes the position of the maximum value in each heatmap, (W, H) denotes the size of the heatmap, (image_width, image_height) denotes the size of the image to be detected, and (U, V) denotes the position of each keypoint of the target object.

According to the technical scheme in the embodiment of the present application, the positions of the keypoints of the target object are determined according to the heatmap group of the target anchor box, which can improve the detection accuracy of keypoints; and the unique index number is generated for the candidate anchor box so that the target heatmap group can be quickly positioned according to the unique index number of the target anchor box, thereby improving the determination efficiency of the positions of the keypoints of the target object.

Figure 3A:
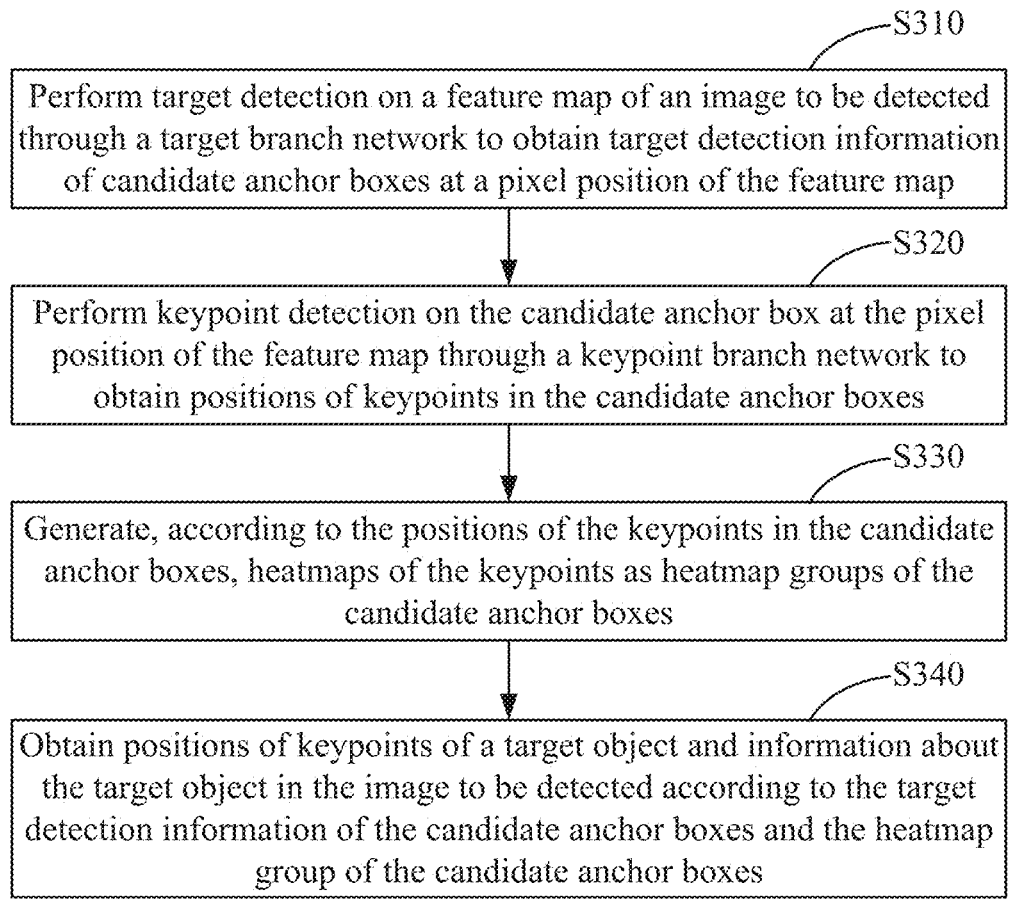
FIG. 3A is a flowchart of another image detection method according to an embodiment of the present application.

FIG. 3A is a flowchart of another image detection method according to an embodiment of the present application. This embodiment is an alternative scheme provided on the basis of the preceding embodiments. Referring to FIG. 3A, the image detection method provided in this embodiment includes steps described below.

In S310, target detection is performed on a feature map of an image to be detected through a target branch network so that target detection information of candidate anchor boxes at a pixel position of the feature map is obtained.

In S320, keypoint detection is performed on the candidate anchor boxes at the pixel position of the feature map through a keypoint branch network so that positions of keypoints in the candidate anchor boxes are obtained.

In S330, heatmaps of the keypoints are generated according to the positions of the keypoints in the candidate anchor boxes as the heatmap groups of the candidate anchor boxes.

In S340, positions of keypoints of a target object and information about the target object in the image to be detected are obtained according to the target detection information of the candidate anchor boxes and the heatmap groups of the candidate anchor boxes.

Each heatmap may have the same size. In an embodiment, for each keypoint in the candidate anchor box, a Gaussian response map having a coordinate of the keypoint as a center and σ as a variance may be used as a heatmap of the keypoint, where the Gaussian peak value of the heatmap is 1 and pixel values that are outside a range of 3σ from the Gaussian center are all 0. Using an example in which an object has K keypoints, K heatmaps may be generated for the candidate anchor box according to coordinates of K keypoints of the candidate anchor box as the heatmap group of the candidate anchor box. The heatmap group of the candidate anchor box is outputted from the keypoint branch network, and the candidate anchor box is used as a bridge between the target detection information outputted from the target branch network and the heatmap group outputted from the keypoint branch network, thereby implementing the joint detection of the target object and keypoints and improving the detection efficiency of the target object and the keypoints.

In an alternative embodiment, the feature map includes a first feature map, a second feature map and a third feature map whose sizes increase in sequence; the target branch network includes a first target branch network, a second target branch network and a third target branch network whose sizes increase in sequence; and the keypoint branch network includes a first keypoint branch network, a second keypoint branch network and a third keypoint branch network whose sizes increase in sequence; the first feature map is input to the first target branch network; the second feature map is input to the second target branch network; the third feature map is input to the third target branch network; and the third feature map is also input to the first keypoint branch network, the second keypoint branch network and the third keypoint branch network. The first keypoint branch network is associated with the first target branch network, the second keypoint branch network is associated with the second target branch network, and the third keypoint branch network is associated with the third target branch network.

Figure 3B:
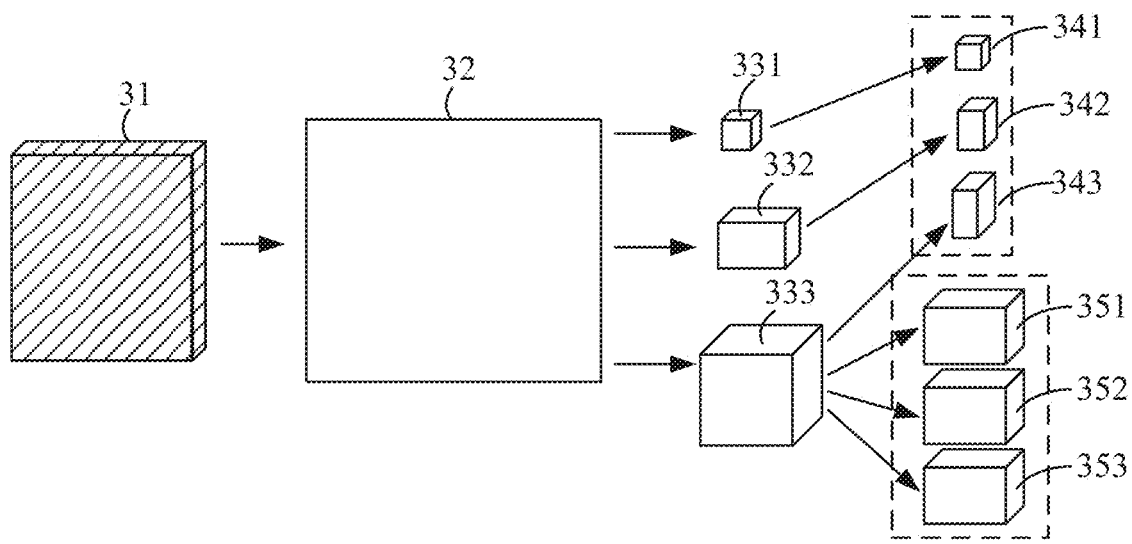
FIG. 3B is a structure diagram of an image detection model according to an embodiment of the present application.

FIG. 3B is a structure diagram of an image detection model according to an embodiment of the present application. Referring to FIG. 3B, the image to be detected 31 is inputted into a feature extraction network 32 in the image detection model so that the first feature map 331, the second feature map 332 and the third feature map 333 whose sizes increase in sequence may be obtained; the first feature map 331 is inputted to the first target branch network 341, the second feature map 332 is inputted to the second target branch network 342, the third feature map 333 is inputted to the third target branch network 343, and the third feature map 333 is inputted to the first keypoint branch network 351, the second keypoint branch network 352 and the third keypoint branch network 353, separately. Therefore, a bounding box outputted from the first target branch network 341 has the same size as the first feature map 331, a bounding box outputted from the second target branch network 342 has the same size as the second feature map 332, and a bounding box outputted from the third target branch network 343 has the same size as the third feature map 333. Heatmaps outputted from the first keypoint branch network 351, the second keypoint branch network 352 and the third keypoint branch network 353 all have the same size as the third feature map 333.

Using an example in which the first feature map 331 has a size of 13×13×255, the second feature map 332 has a size of 26×26×255, and the third feature map 333 has a size of 52×52×255, the bounding boxes outputted from the first target branch network 341, the second target branch network 342 and the third target branch network 343 have sizes of 13×13, 26×26 and 52×52, respectively, and the heatmaps outputted from the three keypoint branch networks all have a size of 52×52.

After the target object is determined according to the target detection information from any one of the target branch networks, a keypoint branch network associated with the one target branch network is determined, the target anchor box is selected from candidate anchor boxes of the keypoint branch network, and the positions of the keypoints of the target object are determined according to the heatmap group of the target anchor box. For example, after the target object is obtained according to the target detection information from the first target branch network, a target anchor box is selected from candidate anchor boxes of the first keypoint branch network, and the positions of the keypoints of the target object are determined according to the heatmap group of the target anchor box. Target objects of different scales can be perceived by supporting multi-scale feature maps.

According to the technical scheme in the embodiments of the present application, multi-scale target detection and multi-scale keypoint detection are supported so that target objects of different scales can be recognized.

Figure 4A:
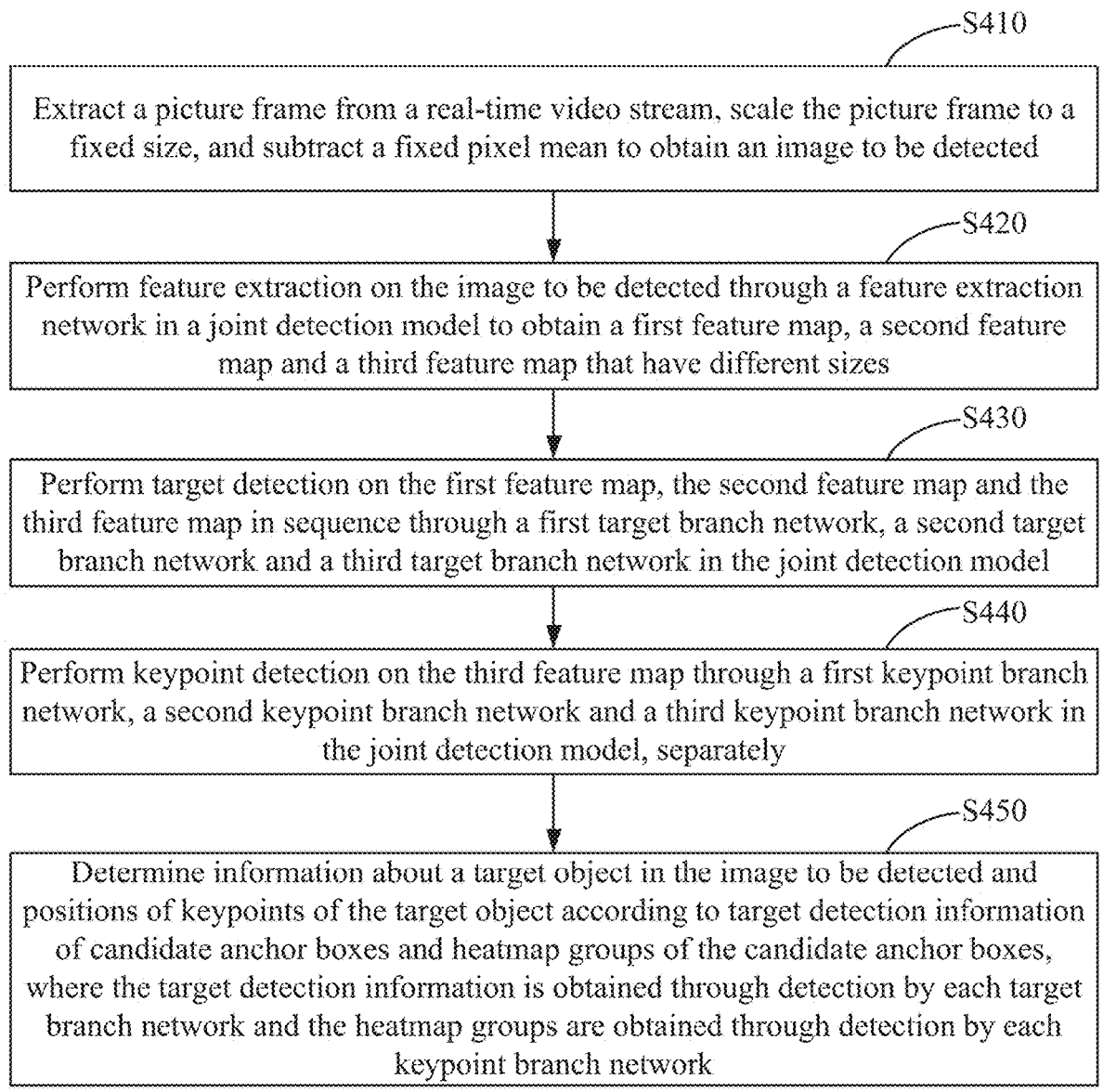
FIG. 4A is a flowchart of another image detection method according to an embodiment of the present application.

FIG. 4A is a flowchart of another image detection method according to an embodiment of the present application. This embodiment is an alternative scheme provided on the basis of the preceding embodiments. Referring to FIG. 4A, the image detection method provided in this embodiment includes steps described below.

In S410, a picture frame is extracted from a real-time video stream and scaled to a fixed size, and a fixed pixel mean is subtracted so that an image to be detected is obtained.

The real-time video stream may be a real-time video stream of a camera in a monitoring scenario or other scenarios. The fixed size may be preset, for example, may be 416×416. The fixed pixel mean may be a pixel mean on a general data set. The preceding processing can enhance the robustness of a joint detection model.

In S420, feature extraction is performed on the image to be detected by a feature extraction network in the joint detection model so that a first feature map, a second feature map and a third feature map that have different sizes are obtained.

In S430, target detection is performed on the first feature map, the second feature map and the third feature map in sequence through a first target branch network, a second target branch network and a third target branch network in the joint detection model.

In S440, keypoint detection is performed on the third feature map separately through a first keypoint branch network, a second keypoint branch network and a third keypoint branch network in the joint detection model.

In S450, positions of keypoints of a target object and information about the target object in the image to be detected are determined according to target detection information of candidate anchor boxes and heatmap groups of the candidate anchor boxes, where the target detection information of the candidate anchor boxes is obtained through detection by each target branch network and the heatmap groups of the candidate anchor boxes are obtained through detection by each keypoint branch network.

At the sample marking stage of the joint detection model, for each target object in a sample image, a ground-truth bounding box of the target object is determined; and a heatmap group is generated for the target object according to the positions of the keypoints of the target object.

A target branch network generates A anchor boxes with different sizes and proportions at each pixel position of a feature map. A width and a height of a prediction result of detection by the first target branch network are the same as the size of the first feature map, for example, are 13×13; a width and a height of a prediction result of detection by the second target branch network are the same as the size of the second feature map, for example, are 26×26; and a width and a height of a prediction result of detection by the third target branch network are the same as the size of the third feature map, for example, are 52×52.

Channels in the keypoint branch network have a correspondence with pixels in the target branch network. A keypoint branch network generates a heatmap group for an anchor box at a pixel position of a feature map in a target branch network associated with the keypoint branch network. The first keypoint branch network generates the heatmap group for an anchor box at each pixel position in the feature map of the first target branch network; the second keypoint branch network generates the heatmap group for an anchor box at each pixel position in the feature map of the second target branch network; and the third keypoint branch network generates the heatmap group for an anchor box at each pixel position in the feature map of the third target branch network.

Figure 4B:
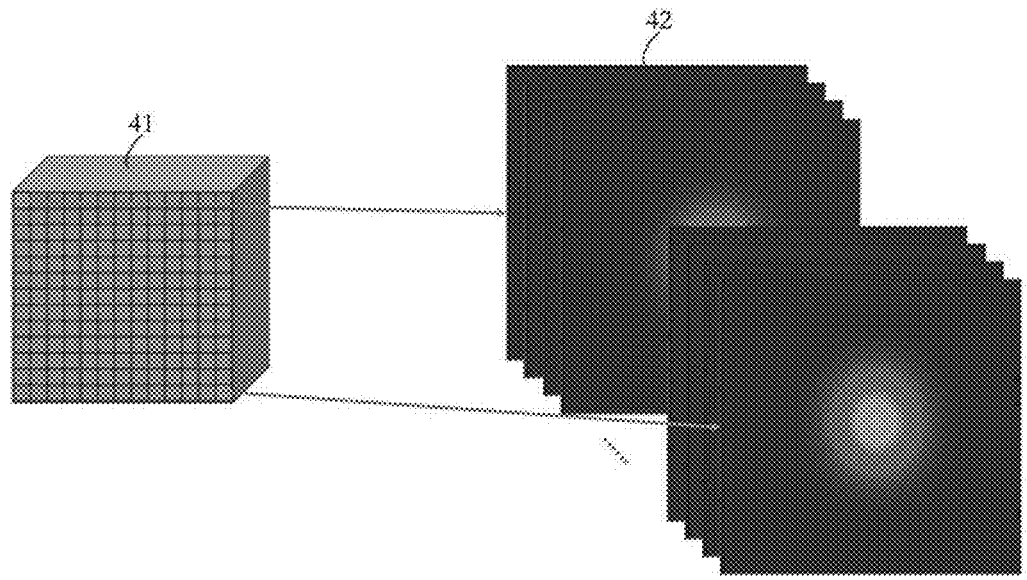
FIG. 4B is a schematic diagram of a relationship between output of a target branch network and output of a keypoint branch network according to an embodiment of the present application.

Referring to FIG. 4B, output 41 of a target branch network has an association relationship with output 42 of a keypoint branch network associated with the target branch network. The first target branch network generates A candidate anchor boxes for each pixel point, that is, 13×13×A candidate anchor boxes in total, which correspond to heatmap groups of the 13×13×A anchor boxes from the first keypoint branch network. Each heatmap group includes K keypoint heatmaps each having a width of 52 and a height of 52. Therefore, an index number of a heatmap group, which is generated by the first target branch network for an anchor box in an $a^{th}$ class, an $i^{th}$ row and a $j^{th}$ column, is $c=a\times13\times13+j\times13+i$. The second target branch network generates A anchor boxes for each pixel point, that is, 26×26×A anchor boxes in total, which correspond to heatmap groups of the 26×26×A anchor boxes from the second keypoint branch network. Each heatmap group includes K keypoint heatmaps each having a width of 52 and a height of 52. Therefore, an index number of a heatmap group, which is generated by the second target branch network for an anchor box in an $a^{th}$ class, an $i^{th}$ row and a $j^{th}$ column, is $c=a\times26\times26+j\times26+i$. The third target branch network generates A anchor boxes for each pixel point, that is, 52×52×A anchor boxes in total, which correspond to heatmap groups of the 52×52×A anchor boxes from the third keypoint branch network. Each heatmap group includes K keypoint heatmaps each having a width of 52 and a height of 52. Therefore, an index number of a heatmap group, which is generated by the third target branch network for an anchor box in an $a^{th}$ class, an $i^{th}$ row and a $j^{th}$ column, is $c=a\times52\times52+j\times52+i$.

At the model detection stage, the target detection information outputted from each target branch network is processed, the target object is obtained according to the target detection information outputted from any target branch network, and the ground-truth bounding box and a category of the target object, an anchor box number, a size of the feature map and the pixel position of the feature map of the target anchor box are obtained based on the target branch network. An index number of the target anchor box is determined based on an index number relationship of the keypoint branch network associated with the target branch network and according to the size of the feature map, the anchor box number and the pixel position of the feature map of the target anchor box, and a heatmap group of the target anchor box is obtained from the heatmap groups outputted from the keypoint branch network according to the index number of the target anchor box. Using an example in which the target object is determined by the first target branch network, the index number of the target anchor box is determined based on $c=a\times13\times13+j\times13+i$; using an example in which the target object is determined by the second target branch network, the index number of the target anchor box is determined based on $c=a\times26\times26+j\times26+i$; and using an example in which the target object is determined by the third target branch network, the index number of the target anchor box is determined based on $c=a\times52\times52+j\times52+i$. If a coordinate (i, j) of the maximum value in a kth heatmap in the heatmap group of the target anchor box is acquired, a coordinate of a kth keypoint of the target object on the image to be detected is ((i/52)×image_width, j/52×image_height), where (image_width, image_height) denotes a width and a height of the image to be detected.

According to the technical scheme in the embodiment of the present application, detection boxes of all targets in an image and coordinates of keypoints of these targets can be obtained by simply performing extraction on the image once with a deep learning model. Compared with a traditional top-down scheme, the present disclosure has operation performance that is not affected by the number of objects in the image. Compared with the traditional top-down scheme, the present disclosure can output keypoints in a one-to-one correspondence with predicted detection boxes without performing complex clustering post-processing algorithms, thereby improving the accuracy of keypoints.

Figure 5:
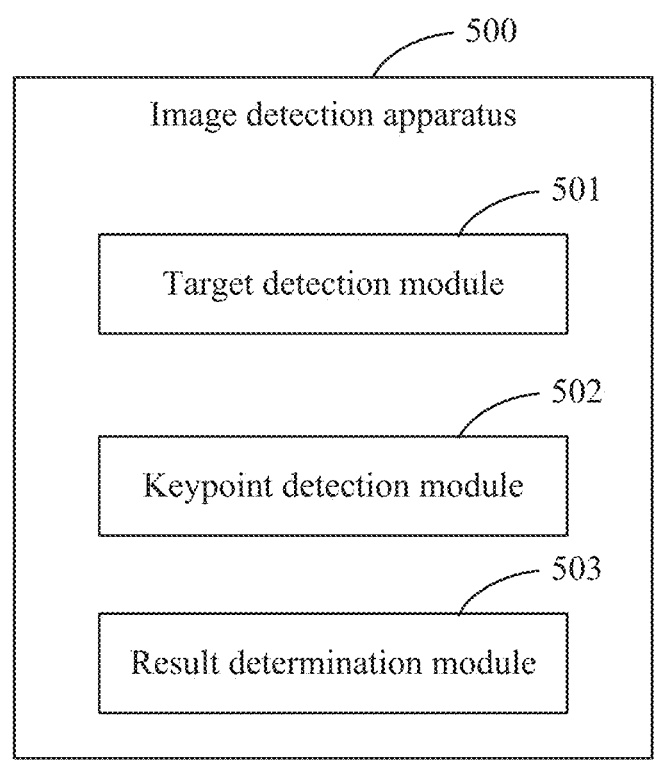
FIG. 5 is a structure diagram of an image detection apparatus according to an embodiment of the present application.

FIG. 5 is a structure diagram of an image detection apparatus according to an embodiment of the present application. Referring to FIG. 5, the image detection apparatus 500 provided in the embodiment of the present application may include a target detection module 501, a keypoint detection module 502 and a result determination module 503.

The target detection module 501 is configured to perform target detection on a feature map of an image to be detected through a target branch network to obtain target detection information of candidate anchor boxes at a pixel position of the feature map.

The keypoint detection module 502 is configured to perform keypoint detection on the feature map of the image to be detected through a keypoint branch network to obtain heatmap groups of the candidate anchor boxes at the pixel position of the feature map.

The result determination module 503 is configured to obtain information about a target object in the image to be detected and positions of keypoints of the target object according to the target detection information of the candidate anchor boxes and the heatmap groups of the candidate anchor boxes.

In an alternative embodiment, the keypoint detection module 502 includes a keypoint detection unit and a heatmap group generation unit.

The keypoint detection unit is configured to perform the keypoint detection on the candidate anchor boxes at the pixel position of the feature map through the keypoint branch network to obtain positions of keypoints in the candidate anchor boxes.

The heatmap group generation unit is configured to generate heatmaps of the keypoints according to the positions of the keypoints in the candidate anchor boxes as the heatmap groups of the candidate anchor boxes.

In an alternative embodiment, the result determination module 503 includes a target result unit, a heatmap group selection unit and a keypoint result unit.

The target result unit is configured to determine the information about the target object in the image to be detected according to the target detection information of the candidate anchor boxes and use a candidate anchor box associated with the target object as a target anchor box.

The heatmap group selection unit is configured to select a heatmap group of the target anchor box from the heatmap groups of the candidate anchor boxes.

The keypoint result unit is configured to determine the positions of the keypoints of the target object according to the heatmap groups of the target anchor boxes.

In an alternative embodiment, the heatmap group selection unit includes an index number subunit and a heatmap group subunit.

The index number subunit is configured to obtain a target index number according to a size of the feature map, an anchor box number and the pixel position of the feature map of the target anchor box.

The heatmap group subunit is configured to select a heatmap group associated with the target index number from the heatmap groups of the candidate anchor boxes as the heatmap group of the target anchor box.

In an optional embodiment, the index number subunit is configured to obtain the target index number by the following formula:

$$c=a\times w\times h+j\times w+i;$$

where (i, j) denotes the pixel position of the feature map of the target anchor box, a denotes the anchor box number, (w, h) denotes the size of the feature map, and c denotes the target index number.

In an alternative embodiment, the keypoint result unit includes a maximum value subunit and a keypoint position subunit.

The maximum value subunit is configured to determine a position of a maximum value in each heatmap in the heatmap group of the target anchor box.

The keypoint position subunit is configured to determine the positions of the keypoints of the target object according to the position of the maximum value in each heatmap, a size of the each heatmap and a size of the image to be detected.

In an alternative embodiment, the feature map includes a first feature map, a second feature map and a third feature map whose sizes increase in sequence; the target branch network includes a first target branch network, a second target branch network and a third target branch network whose sizes increase in sequence; and the keypoint branch network includes a first keypoint branch network, a second keypoint branch network and a third keypoint branch network whose sizes increase in sequence.

The first feature map is input to the first target branch network.

The second feature map is input to the second target branch network.

The third feature map is input to the third target branch network.

The third feature map is also input to the first keypoint branch network, the second keypoint branch network and the third keypoint branch network.

According to the technical schemes in the embodiment of the present application, detection boxes of all targets in an image and coordinates of keypoints of these targets can be obtained by simply performing extraction on the image once with a deep learning model. Therefore, the detection efficiency of targets and keypoints in the image can be improved and the accuracy of keypoints can be improved.

According to embodiments of the present disclosure, the present disclosure further provides an electronic device, a readable storage medium and a computer program product.

Figure 6:
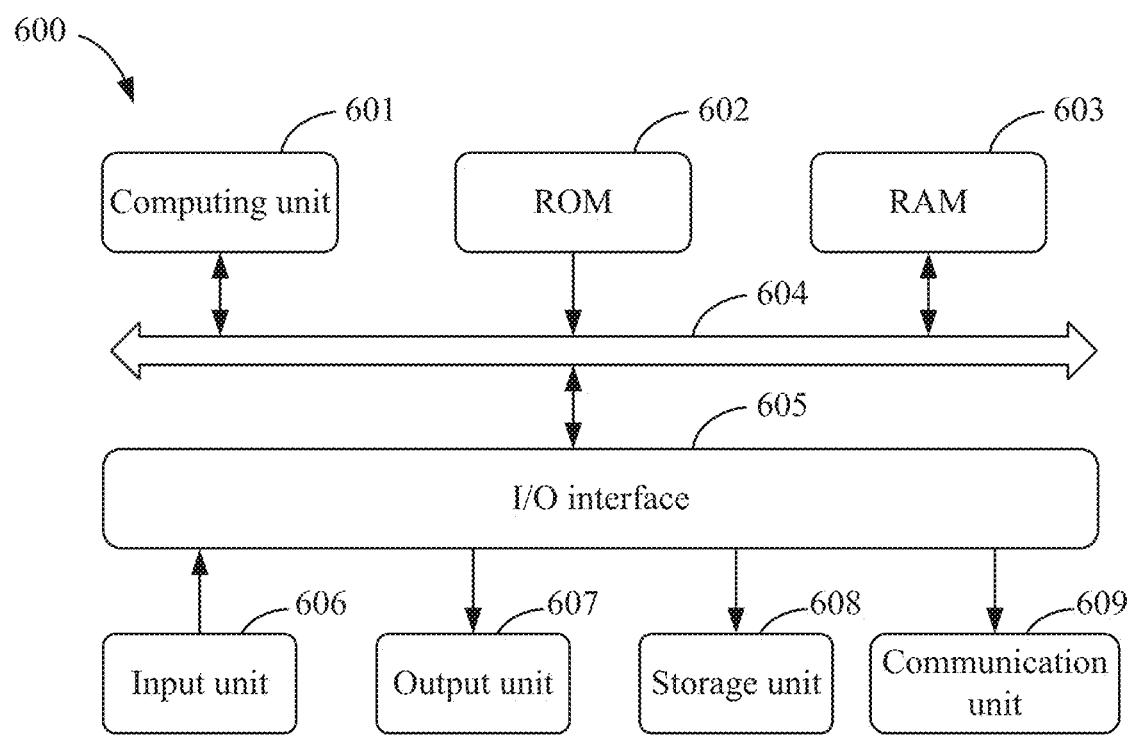
FIG. 6 is a block diagram of an electronic device for implementing an image detection method according to an embodiment of the present application.

FIG. 6 is a block diagram illustrative of an exemplary electronic device 600 that may be used for implementing embodiments of the present disclosure. The electronic device is intended to represent various forms of digital computers, for example, a laptop computer, a desktop computer, a worktable, a personal digital assistant, a servers, a blade server, a mainframe computer and other applicable computers. The electronic device may further represent various forms of mobile devices, for example, a personal digital assistant, a cellphone, a smartphone, a wearable device and other similar computing devices. Herein the shown components, the connections and relationships between these components, and the functions of these components are illustrative only and are not intended to limit the implementation of the present disclosure as described and/or claimed herein.

As shown in FIG. 6, the device 600 includes a computing unit 601. The computing unit 601 may perform various types of appropriate operations and processing based on a computer program stored in a read-only memory (ROM) 602 or a computer program loaded from a storage unit 608 to a random-access memory (RAM) 603. Various programs and data required for operations of the device 600 may also be stored in the RAM 603. The computing unit 601, the ROM 602 and the RAM 603 are connected to each other through a bus 604. An input/output (I/O) interface 605 is also connected to the bus 604.

Multiple components in the device 600 are connected to the I/O interface 605. The multiple components include an input unit 606 such as a keyboard and a mouse, an output unit 607 such as various types of displays and speakers, the storage unit 608 such as a magnetic disk and an optical disk, and a communication unit 609 such as a network card, a modem and a wireless communication transceiver. The communication unit 609 allows the device 600 to exchange information/data with other devices over a computer network such as the Internet and/or various telecommunications networks.

The computing unit 601 may be various general-purpose and/or dedicated processing components having processing and computing capabilities. Some examples of the computing unit 601 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers and microcontrollers. The computing unit 601 performs various methods and processing described above, such as the image detection method. For example, in some embodiments, the image detection method may be implemented as a computer software program tangibly contained in a machine-readable medium such as the storage unit 608. In some embodiments, part or all of a computer program may be loaded and/or installed on the device 600 via the ROM 602 and/or the communication unit 609. When the computer program is loaded to the RAM 603 and executed by the computing unit 601, one or more steps of the preceding image detection method may be performed. Alternatively, in other embodiments, the computing unit 601 may be configured, in any other suitable manner (for example, by means of firmware), to perform the image detection method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementing the methods of the present disclosure may be compiled in any combination of one or more programming languages. These program codes may be provided for a processor or controller of a general-purpose computer, a dedicated computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with a system, apparatus or device that executes instructions. The machine-readable medium may be a machine-readable signal medium or a machine-readable storage medium. Machine-readable media may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host, which is a host product in a cloud computing service system, so as to solve the defects of difficult management and weak traffic scalability in traditional physical hosts and VPS services.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. An image detection method, comprising:
    performing target detection on a feature map of an image to be detected through a target branch network to obtain target detection information of candidate anchor boxes at a pixel position of the feature map;
    performing keypoint detection on the feature map of the image to be detected through a keypoint branch network to obtain heatmap groups of the candidate anchor boxes at the pixel position of the feature map; and
    obtaining positions of keypoints of a target object and information about the target object in the image to be detected according to the target detection information of the candidate anchor boxes and the heatmap groups of the candidate anchor boxes;
    wherein obtaining the positions of the keypoints of the target object and the information about the target object in the image to be detected according to the target detection information of the candidate anchor boxes and the heatmap groups of the candidate anchor boxes comprises:
        determining, according to the target detection information of the candidate anchor boxes, the information about the target object in the image to be detected, and using a candidate anchor box associated with the information about the target object as a target anchor box;
        selecting a heatmap group of the target anchor box from the heatmap groups of the candidate anchor boxes; and
        determining the positions of the keypoints of the target object according to the heatmap group of the target anchor box;
    wherein selecting the heatmap group of the target anchor box from the heatmap groups of the candidate anchor boxes comprises:
        obtaining a target index number according to a size of the feature map, an anchor box number and the pixel position of the feature map of the target anchor box; and
        selecting a heatmap group associated with the target index number from the heatmap groups of the candidate anchor boxes as the heatmap group of the target anchor box.

2. The method of claim 1, wherein performing the keypoint detection on the feature map of the image to be detected through the keypoint branch network to obtain the heatmap groups of the candidate anchor boxes at the pixel position of the feature map comprises:
    performing the keypoint detection on the candidate anchor boxes at the pixel position of the feature map through the keypoint branch network to obtain positions of keypoints in the candidate anchor boxes; and
    generating, according to the positions of the keypoints in the candidate anchor boxes, heatmaps of the keypoints as the heatmap groups of the candidate anchor boxes.

3. The method of claim 1, wherein obtaining the target index number according to the size of the feature map, the anchor box number and the pixel position of the feature map of the target anchor box comprises:
    obtaining the target index number by the following formula:

$$c = a \times w \times h + j \times w + i;$$

wherein (i, j) denotes the pixel position of the feature map of the target anchor box, a denotes the anchor box number, (w, h) denotes the size of the feature map, and c denotes the target index number.

4. The method of claim 1, wherein determining the positions of the keypoints of the target object according to the heatmap group of the target anchor box comprises:
    determining a position of a maximum value in each heatmap in the heatmap group of the target anchor box; and
    determining the positions of the keypoints of the target object according to the position of the maximum value in each heatmap, a size of the each heatmap and a size of the image to be detected.

5. The method of claim 1, wherein the feature map comprises a first feature map, a second feature map and a third feature map whose sizes increase in sequence; the target branch network comprises a first target branch network, a second target branch network and a third target branch network whose sizes increase in sequence; and the keypoint branch network comprises a first keypoint branch network, a second keypoint branch network and a third keypoint branch network whose sizes increase in sequence;
    wherein the first feature map is input to the first target branch network;
    the second feature map is input to the second target branch network;
    the third feature map is input to the third target branch network; and
    the third feature map is also input to the first keypoint branch network, the second keypoint branch network and the third keypoint branch network.

6. An electronic device, comprising:
    at least one processor; and
    a memory communicatively connected to the at least one processor;
    wherein the memory stores an instruction executable by the at least one processor, and the instruction is executed by the at least one processor to cause the at least one processor to execute:

performing target detection on a feature map of an image to be detected through a target branch network to obtain target detection information of candidate anchor boxes at a pixel position of the feature map;

performing keypoint detection on the feature map of the image to be detected through a keypoint branch network to obtain heatmap groups of the candidate anchor boxes at the pixel position of the feature map; and obtaining positions of keypoints of a target object and information about the target object in the image to be detected according to the target detection information of the candidate anchor boxes and the heatmap groups of the candidate anchor boxes;

wherein the instruction is executed by the at least one processor to cause the at least one processor to execute obtaining the positions of the keypoints of the target object and the information about the target object in the image to be detected according to the target detection information of the candidate anchor boxes and the heatmap groups of the candidate anchor boxes by:

determining, according to the target detection information of the candidate anchor boxes, the information about the target object in the image to be detected, and using a candidate anchor box associated with the information about the target object as a target anchor box;

selecting a heatmap group of the target anchor box from the heatmap groups of the candidate anchor boxes; and determining the positions of the keypoints of the target object according to the heatmap group of the target anchor box;

wherein the instruction is executed by the at least one processor to cause the at least one processor to execute selecting the heatmap group of the target anchor box from the heatmap groups of the candidate anchor boxes by:

obtaining a target index number according to a size of the feature map, an anchor box number and the pixel position of the feature map of the target anchor box; and selecting a heatmap group associated with the target index number from the heatmap groups of the candidate anchor boxes as the heatmap group of the target anchor box.

7. The electronic device of claim 6, wherein the instruction is executed by the at least one processor to cause the at least one processor to execute performing the keypoint detection on the feature map of the image to be detected through the keypoint branch network to obtain the heatmap groups of the candidate anchor boxes at the pixel position of the feature map by:

performing the keypoint detection on the candidate anchor boxes at the pixel position of the feature map through the keypoint branch network to obtain positions of keypoints in the candidate anchor boxes; and generating, according to the positions of the keypoints in the candidate anchor boxes, heatmaps of the keypoints as the heatmap groups of the candidate anchor boxes.

8. The electronic device of claim 6, wherein the instruction is executed by the at least one processor to cause the at least one processor to execute obtaining the target index number according to the size of the feature map, the anchor box number and the pixel position of the feature map of the target anchor box by:

obtaining the target index number by the following formula:

$$c = a \times w \times h + j \times w + i;$$

wherein (i, j) denotes the pixel position of the feature map of the target anchor box, a denotes the anchor box number, (w, h) denotes the size of the feature map, and c denotes the target index number.

9. The electronic device of claim 6, wherein the instruction is executed by the at least one processor to cause the at least one processor to execute determining the positions of the keypoints of the target object according to the heatmap group of the target anchor box by:

determining a position of a maximum value in each heatmap in the heatmap group of the target anchor box; and determining the positions of the keypoints of the target object according to the position of the maximum value in each heatmap, a size of the each heatmap and a size of the image to be detected.

10. The electronic device of claim 6, wherein the feature map comprises a first feature map, a second feature map and a third feature map whose sizes increase in sequence; the target branch network comprises a first target branch network, a second target branch network and a third target branch network whose sizes increase in sequence; and the keypoint branch network comprises a first keypoint branch network, a second keypoint branch network and a third keypoint branch network whose sizes increase in sequence;

wherein the first feature map is input to the first target branch network;

the second feature map is input to the second target branch network;

the third feature map is input to the third target branch network; and the third feature map is also input to the first keypoint branch network, the second keypoint branch network and the third keypoint branch network.

11. A non-transitory computer-readable storage medium, storing a computer instruction for causing a computer to execute:

performing target detection on a feature map of an image to be detected through a target branch network to obtain target detection information of candidate anchor boxes at a pixel position of the feature map;

performing keypoint detection on the feature map of the image to be detected through a keypoint branch network to obtain heatmap groups of the candidate anchor boxes at the pixel position of the feature map; and obtaining positions of keypoints of a target object and information about the target object in the image to be detected according to the target detection information of the candidate anchor boxes and the heatmap groups of the candidate anchor boxes;

wherein the computer instruction causes the computer to execute obtaining the positions of the keypoints of the target object and the information about the target object in the image to be detected according to the target detection information of the candidate anchor boxes and the heatmap groups of the candidate anchor boxes by:

determining, according to the target detection information of the candidate anchor boxes, the information about the target object in the image to be detected, and using a candidate anchor box associated with the information about the target object as a target anchor box;

selecting a heatmap group of the target anchor box from the heatmap groups of the candidate anchor boxes; and determining the positions of the keypoints of the target object according to the heatmap group of the target anchor box;

wherein the computer instruction causes the computer to execute selecting the heatmap group of the target anchor box from the heatmap groups of the candidate anchor boxes by:

obtaining a target index number according to a size of the feature map, an anchor box number and the pixel position of the feature map of the target anchor box; and selecting a heatmap group associated with the target index number from the heatmap groups of the candidate anchor boxes as the heatmap group of the target anchor box.

12. The storage medium of claim 11, wherein the computer instruction causes the computer to execute performing the keypoint detection on the feature map of the image to be detected through the keypoint branch network to obtain the heatmap groups of the candidate anchor boxes at the pixel position of the feature map by:

performing the keypoint detection on the candidate anchor boxes at the pixel position of the feature map through the keypoint branch network to obtain positions of keypoints in the candidate anchor boxes; and generating, according to the positions of the keypoints in the candidate anchor boxes, heatmaps of the keypoints as the heatmap groups of the candidate anchor boxes.

13. The storage medium of claim 11, wherein the computer instruction causes the computer to execute obtaining the target index number according to the size of the feature map, the anchor box number and the pixel position of the feature map of the target anchor box by:

obtaining the target index number by the following formula:

$$c = a \times w \times h + j \times w + i;$$

wherein (i, j) denotes the pixel position of the feature map of the target anchor box, a denotes the anchor box number, (w, h) denotes the size of the feature map, and c denotes the target index number.

14. A computer program product, comprising a computer program which, when executed by a processor, implements the method of claim 1.

* * * * *